United States Patent [19]

Peos

[11] 3,883,455
[45] May 13, 1975

[54] NON-BLEEDING VINYLIDENE CHLORIDE COPOLYMER COATINGS

[75] Inventor: Charles E. Peos, East Orange, N.J.

[73] Assignee: A. E. Staley Manufacturing Co., Decatur, Ill.

[22] Filed: Nov. 7, 1972

[21] Appl. No.: 304,427

[52] U.S. Cl............ 260/23 XA; 106/263; 106/264; 117/226
[51] Int. Cl...................... C08f 19/14; C08f 21/04
[58] Field of Search............... 260/23 XA, 29.6 TA; 106/263, 264; 117/226

[56] References Cited
UNITED STATES PATENTS

| | | | |
|---|---|---|---|
| 3,333,977 | 8/1967 | Clark | 106/263 |
| 3,333,978 | 8/1967 | Clark | 106/264 |
| 3,477,940 | 11/1969 | Grangaard | 117/226 |
| 3,714,106 | 1/1973 | Smith et al. | 260/29.6 TA |

Primary Examiner—Melvin I. Marquis
Assistant Examiner—William E. Parker
Attorney, Agent, or Firm—M. Paul Hendrickson; C. J. Meyerson

[57] ABSTRACT

Woods of a high phenolic content can be coated or painted with vinylidene chloride emulsions which contain an organic monocarboxylic acid and buffering salts without being susceptible to bleeding. Surfaces of redwoods and/or cedars painted with formulations containing the vinylidene chloride emulsion composition exhibit unexpectedly superior resistance against deterioration and bleeding even after weathering for prolonged periods of time under adverse climatic conditions.

32 Claims, No Drawings

NON-BLEEDING VINYLIDENE CHLORIDE COPOLYMER COATINGS

BACKGROUND OF THE INVENTION

Woods of a high phenolic content, such as cedar and redwood, are highly susceptible to bleeding (occasionally referred to as "staining"). Bleeding is the diffusion of coloring matter through a coating from a substrate or the coating discoloration arising from such diffusion. This undesirable bleeding problem becomes particularly acute when these woods are coated with a water paint.

Thus, it is conventional to paint or coat woods of a high phenolic content with drying oils which utilize a volatile organic solvent. The combination of organic solvents and drying oils are more effective in inhibiting bleeding of woods which are coated or painted therewith. Although it would be desirable to utilize a water paint for such purposes, it has been generally recognized that the water-based paints cannot effectively inhibit bleeding. A suggested approach has been to precondition woods of high phenolic content with organic solvents or chemical reagents to remove, fix or prime the bleeding constituents and thereafter paint the surface with a latex paint. Because of cost, time and effort considerations, the preconditioning approach is not a pragmatic solution to the problem. As a result, the oil based paints containing organic solvents have retained their dominant position as a means for painting woods of a high phenolic content such as redwoods and cedars. If possible, it would be highly desirable to employ water dispersible paints as a replacement for the drying oil paints.

In U.S. Pat. Nos. 3,333,977 and 3,333,978, both by Clark et al., water dispersible paints suitable for painting woods of a high phenolic content are disclosed. Although both these patents eliminate the need for organic volatile solvent systems, the overall paint composition substantially corresponds in film forming characteristics to conventional oil based paints. Similar to the prior art, these water dispersible paints require drying oils and heavy metal drying agents as the coating components. In general, the water dispersible paints of U.S. Pat. No. 3,333,977 rely upon the combination of a drying oil, a heavy metal carboxylic acid salt drying agent and either an oxidizing agent, inorganic acid or a lower alkyl monocarboxylic acid. The drying agent is necessarily present in an amount sufficient to retard surface staining of the wood. The water dispersible paints of U.S. Pat. No. 3,333,978 are similar excepting the presence of a water soluble heavy metal salt and either an inorganic mineral acid or a low molecular weight fatty acid. Although these water based drying oil paint compositions have been known for a decade, the stain retarding water based paints have not been deemed an adequate replacement for conventional, organic solvent, drying oil paints.

OBJECTS OF THE INVENTION

An object of the present invention is to provide a water based coating composition which retards the surface staining of phenolic-containing wood when coated therewith.

Another object of the invention is to provide a water paint of a high pigment volume concentration (i.e., PVC) without adversely effecting its anti-staining characteristics when applied to the surface of woods of a high phenolic content.

An additional object of the present invention is to provide a water based coating composition capable of retarding surface staining of phenolic woods without necessitating a drying oil.

A further object is to provide an aqueous based vinylidene chloride copolymer coating composition suitable for use as an exterior paint and characterized as possessing improved ease of application and resistance against deterioration upon aging and weathering.

DISCLOSURE OF THE INVENTION

This invention relates to water based coating compositions suitable for coating woods which are susceptible to bleeding. More particularly, the present invention relates to vinylidene chloride copolymer emulsion which contains a sufficient amount of an organic acid and an organic acid salt to impart non-bleeding characteristics to the emulsion composition when coatings thereof are applied to woods of a high, water soluble phenolic content.

According to the present invention, there is provided a vinylidene chloride emulsion composition suitable for use in coating phenolic containing woods and possessing sufficient anti-bleeding characteristics to inhibit bleeding, said emulsion composition comprising:

A. a vinylidene chloride copolymer containing:
  a. about 40% to 80% by weight vinylidene chloride,
  b. about 20% to 60% by weight of an alkyl ester of an alpha, beta-ethylenically unsaturated acid wherein the alkyl ester group containing from 1 to 8 carbon atoms, and
  c. about 0.5 to about 3% by weight of at least one alpha, beta-ethylenically unsaturated monomer selected from the group consisting of ethylenically unsaturated monocarboxylic acid, ethylenically unsaturated dicarboxylic acid, ethylenically unsaturated dicarboxylic acid anhydride, acrylamide, methacrylamide and N-substituted acrylamides, B. an organic carboxylic acid in an amount ranging from at least about 3.0 to about 10.0 parts by weight acid for each 100 parts by weight vinylidene chloride copolymer dry solids, and C. an organic carboxylic acid salt in an amount sufficient to buffer the vinylidene chloride emulsion composition to a pH of about 3.0 to about 6.0.

It has been unexpectedly discovered that the vinylidene chloride emulsion in combination with the organic carboxylic acid and the organic acid salt possess sufficient stain inhibition characteristics to be directly applied to woods of a high phenolic content such as redwood and cedar. The ability of the coating composition to retard surface staining or bleeding of phenolic containing woods makes the coating compositions particularly useful in paints. When exposed to adverse climatic conditions for a prolonged period of time, high phenolic woods painted with a water paint containing the vinylidene chloride copolymer emulsion composition do not evince any diffusion of the staining principals into or through the coating surface. Since the vinylidene chloride coating compositions of the invention per se possess sufficient retardation against staining, the coating composition may be suitably formulated, as desired, with or without drying oil as a film forming conjunct. If desired, the coating composition may be formulated with a drying oil to optimize adhesion to excessively chalky substrates. The vinylidene chloride coating compositions herein readily wet, penetrate and adhere to wood surfaces of a high phenolic water soluble content and may be directly applied to the wood surface without requiring any pretreatment or preconditioning of the wood. The leveling, covering power and hiding power characteristics are excellent. The coating compositions are particularly adapted for use in paints of a high PVC without adversely effecting its ease of application, viscosity, film forming attributes and bleeding characteristics. These characteristics make the paints and emulsion compositions particularly adapted to be applied to wood by a brush without leaving brushing marks. The coating compositions possess excellent barrier properties and can be used as a primer for other woods and metallic substrates. The coating compositions are particularly useful as a primer or a single coat paint for woods such as redwood or cedar. Wood surfaces of a high phenolic content coated with the coating compositions exhibit unexpectedly superior resistance towards deterioration and bleeding upon weathering for prolonged periods of time and adverse climatic conditions. Generally, the coatings and paints possess excellent adhesion, consistency, durability and aging properties as well as exhibiting resistance againt fading, peeling, hazing, blooming, water spotting, cracking and yellowing.

In the emulsion composition or water paints formulated therewith, the principal film forming or coating agent (on a weight basis) is the vinylidene chloride copolymer. The principal copolymerized monomeric constituent is vinylidene chloride. The vinylidene chloride content may broadly range from about 40% to about 80% of the total copolymer weight. The vinylidene chloride constituent imparts excellent barrier properties and resistance towards grease, oil, solvents, moisture vapor and other gases to the coated surfaces. If the vinylidene chloride copolymer content is less than about 40%, the copolymer will not effectively alleviate the bleeding problem. Conversely, if the vinylidene chloride copolymer content is in excess of about 80%, the copolymers will not sufficiently wet and adhere to the substrate surface. An excessively high copolymerized vinylidene chloride content also adversely imparts an undesirable brittleness to the coating which, in turn, impairs its usefulness. Those copolymers containing from about 45% to about 70% by weight vinylidene chloride, and preferably less than about 60% by weight, have been found especially effective in imparting the improved anti-bleeding characteristics to the coating compositions herein.

In addition to the vinylidene chloride moiety, the copolymers also contain an alkyl ester of an alpha, beta-ethylenically unsaturated which is frequently referred to as an acrylate ester. When copolymerized with vinylidene chloride, the acrylate esters lower the copolymer's glass transition temperature and enhance the copolymer's flexibility. If an excessive amount of acrylate ester is copolymerized with the vinylidene chloride comonomer, the resultant copolymer will fail to possess sufficient anti-staining properties. Conversely, an insufficient amount of copolymerized acrylate ester will fail to impart the desired degree of flexibility. In general, the amount of acrylate ester ranges from about 20% to about 60% of the copolymer weight. Normally, the amount of acrylate ester in conjunction with the other copolymerized vinylidene chloride components should be sufficient to provide a vinylidene chloride copolymer having a glass transition temperature ranging from about 273°K. to about 293°K., and preferably within the range of about 278°K. to about 288°K. As recognized by the art, the glass transition temperature of any given copolymer (e.g., one comprised of four different comonomers, A, B, C and D) can be readily determined by the equation:

$$\frac{1}{T_{gP}} = \frac{\text{weight fraction monomer A}}{T_{gA}} + \frac{\text{weight fraction monomer B}}{T_{gB}} + \frac{\text{weight fraction monomer C}}{T_{gC}} + \frac{\text{weight fraction monomer D}}{T_{gD}}$$

wheren $T_{gP}$, $T_{gA}$, $T_{gB}$, $T_{gC}$ and $T_{gD}$ respectively represent (in Kelvin degrees) the glass transition temperature of the A-B-C-D copolymer and the homopolymer glass transition temperatures of monomers A, B, C and D with the sum of the weight fraction being equal to 1.

Illustrative acrylate esters include those having an alkyl ester group of 1–8 carbon atoms inclusive such as methyl, ethyl, propyl, butyl, octyl, 2-ethylhexyl acrylates, mixtures thereof and the like. Copolymers containing vinylidene chloride as the principal copolymerized moiety in combination with butyl acrylate as the major acrylate ester and methyl acrylate as a minor acrylate ester moiety have been found particularly suitable herein.

Emulsion stability and overall performance of the vinylidene chloride copolymer emulsion coating composition and its utility in paint formulas is significantly enhanced by copolymerizing therewith at least one alpha, beta-ethylenically unsaturated acid monomer selected from the group consisting of an ethylenically unsaturated monocarboxylic acid, ethylenically unsaturated dicarboxylic acid, ethylenically unsaturated acid anhydride, acrylamide, methacrylamide, and N-unsubstituted acrylamides. Illustrative ethylenically unsaturated monocarboxylic acids include acrylic, methyl acrylic, ethyl and propyl acrylic acid. Exemplary unsaturated dicarboxylic acids and the acid anhydrides thereof are phthalic, maleic, itaconic, succinic, malic, tartaric, fumaric and the corresponding anhydrides. Typical unsaturated N-substituted acrylamides include N-methyl, N-ethyl, N-propyl, N-N-butyl, N,N-dimethyl, N,N-diethyl, N,N-di-N-butyl, N-cyclohexyl, N-N-dodecyl acrylamides mixtures thereof and the like. Vinylidene chloride copolymers containing about $1.0 \pm 0.25\%$ by weight itaconic acid and approximately 50% by weight less acrylamide are particularly suitable as copolymerized emulsion monomers herein.

In addition to the aforementioned comonomers, other monoethylenically unsaturated monomers may be copolymerized therewith. In general, these other comonomers will be less than 10% of the copolymer weight and preferably less than 5.0%.

Without the presence of additional additives, the vinylidene chloride copolymer water paints per se cannot effectively prevent surface bleeding in woods of a high phenolic content. However, the vinylidene chloride copolymer in combination with an organic acid and an organic acid salt cooperatively impart and effectively inhibit bleeding.

Based upon 100 parts by weight of the vinylidene chloride copolymer dry solids, the organic acid component ranges from at least about 3 to about 10 parts by weight. Although it is possible to utilize in general saturated and unsaturated carboxylic mono and polycarboxylic acids (e.g., fumaric, adipic, itaconic, succinic, etc.), the volatile lower alkyl monocarboxylic acids containing from 1 to 4 carbon atoms such as fumaric acid, propanoic and butanoic acids and particularly acetic acid are most suitable. The non-bleeding characteristics of the emulsion composition are significantly improved when the amount of organic acid is at least 4.0 parts by weight, and advantageously between about 4.5 to about 8 parts by weight acid for each 100 parts by weight of vinylidene chloride copolymer solids. On an overall basis, the amount of organic acid is preferably less than 6.0 parts by weight.

The third essential component of the vinylidene chloride composition is an organic acid salt buffering agent. Illustrative organic acid salts are the ammonium, primary, secondary and tertiary amines, the alkali and alkaline earth salts of saturated monocarboxylic acids such as the ammonium, the lower alkyl (e.g., 1–4 carbon atoms) secondary and tertiary amines, sodium, potassium and calcium salts of acetic, proponoic, butanoic, heptanoic, octanoic, dodeconoic, etc. Suitable monocarboxlic acid salts containing from 2 to 6 carbon atoms and especially the alkali metal and ammonium salts of acetic acid are most suitable herein.

The organic acid component reduces the pH of vinylidene chloride composition and the organic acid buffers the emulsion to a pH of about 3.0 to 6.0. The anti-stain characteristics of the composition are most suitably provided when at least 4.0 parts by weight organic acid and a sufficient amount of organic acid salt is added to buffer the emulsion within the pH range of 3.5 to 4.5, and preferably at about 4.0. When acetic acid is employed as the organic acid and an alkali acetate such as sodium acetate, the weight ratio of acetic acid to sodium acetate should be at least 9:10. Although the combined use of acetic acid and sodium acetate below a weight ratio of 1:1 will impart a greater degree of surface stain resistance comparative to a vinylidene chloride emulsion per se, a significant improvement thereover is accomplished when the amount of acetic acid on a weight basis is at least equal to or exceeds that of the sodium acetate. A weight ratio of acetic acid to sodium acetate of about 3:1 or more will not generally adversely effect the emulsion's anti-staining properties. Since the addition of an excessive organic acid does not significantly increase the antistaining properties and generally increases the ingredient and packaging costs, the weight ratio of acetic acid to sodium acetate is usually maintained between about 10:9 to about 3:2.

In preparing vinylidene chloride copolymer emulsions, frequently a significantly lesser amount of buffering (which include both organic acids and organic acid salts) is added to facilitate the emulsion polymerization. In determining the amount of organic acid and organic acid salt necessary to provide the non-bleeding emulsion composition of the present invention, the residual organic acids and organic acid salts should be included in ascertaining what additional amounts will be required therefore.

In commerce, the vinylidene chloride emulsion composition may be alternatively formulated to contain organic acid and organic acid salts or they may be added as conjuncts during the final water paint preparation. If it is desired to ship in commerce a vinylidene chloride emulsion containing the organic acid and organic metal salt, a vinylidene chloride emulsion (excluding the weight of the anti-stain additives) will normally contain at least 40% to about 65% by weight emulsion solids with about 50%–60% emulsion solids being most suitable for this purpose. Such an emulsion containing the anti-stain additives may be used, without pigments, as a coating primer for high phenolic woods. In this respect, the vinylidene chloride copolymer emulsion functions as an unpigmented coating primer and possesses sufficient compatability to permit subsequent application of a water paint of a different polymeric composition.

The vinylidene chloride copolymer compositions of the present invention are particularly adapted for use in paints which may be directly applied to woods of a high phenolic content such as redwood and cedar without necessitating any surface preconditioning or pretreatment. The vinylidene chloride emulsion composition is compatible with conventional paint pigments and other water dispersible film forming binders such as those disclosed in U.S. Pat. No. 3,477,940 by F. E. Halleck. The diverse paint ingredients are best selected in a manner such that the emulsion bleeding properties are not imparied thereby. The chloride and sulfate type titanium dioxides contribute to excellent stability in neutral and slightly acid paints and, accordingly, are well suited for the water paint formulations herein disclosed. For self-priming applications where the primer is desired to serve as a topcoat as well as primer, it is recommended that the titanium dioxide level be at least 2.5 pounds per gallon with the PVC being within the 30–35% range for best covering and hiding power.

The PVC for water paints containing the vinylidene chloride copolymer emulsion compositions and possessing non-bleeding coating characteristics can broadly range from about 20% to about 50%. Conventional barium paint additives such as barium metaborate (usually used as a bacteride and fungicide) will alter the PVC level most effectively in preventing bleeding. For example, water paints substantially free from barium metaborates are most effective at about 20% to about 30% PVC level with the optium effectiveness being achieved at about 25% ± 2%. Conversely, if barium metaborates are used as water paint additives, the PVC should be between 25% to about 50% with the best results being achieved at about 35% to about 45% PVC.

The amount of vinylidene chloride copolymer emulsion composition dry solids (based upon the total dry weight of the vehicle portion) may broadly range from about 25% to about 75%. In the absence of barium paint additivies (e.g., barium metaborate), the vinylidene chloride copolymer emulsion composition dry solids will comprise a major portion of the water paint vehicle solids with the best results being achieved at about 70% ± 2%. In the presence of barium metaborate, the vinylidene chloride copolymer emulsion will usually comprise less than about 50% of the paint vehicle solids will improved non-bleeding properties being achieved within the 35 to about 45% by weight range.

Similarly, conventional paint thickeners, tinting bases, anti-agglomerate aids, surfactants and other pigment dispersing aids, extenders, defoamers, drying oils and heavy metal driers, preservatives, other water paint additives may be included in the paint formulation as desired (e.g., see Emulsion and Water-Soluble Paints and Coatings by C. R. Martens, copyright 1964). As previously mentioned, significantly improved water paints for excessively chalky redwoods and cedars are obtained by combining the vinylidene chloride copolymer emulsion composition as the principal water paint vehicle with a drying oil as a minor water paint vehicle. In general, substantially all of the water dispersible drying oils are suitable for this purpose (e.g., see U.S. Pat. Nos. 3,333,977 and 3,333,978 and Fundamentals of Paint, Varnish and Lacquer Technology by Elias Singer, copyright 1957).

In general, conventional paint pigments will increase the water paint pH to about 6.0 to 8.0. Paint formulations having a pH of 8.0 or more will be prone to yellow and bleed. Satisfactory results are achieved when the pH of the water paint is between 6.5 and 7.5 and particularly at 6.8–7.2. Paint formulations substantially free from lead and/or mercury components, without adversely effecting those characteristics normally associated with a high quality latex paint, may easily be prepared herein.

The vinylidene chloride emulsions are suitably prepared by conventional emulsion polymerization processes such as exemplified by copending application Ser. No. 868,209, now U.S. Pat. No. 3,714,106, filed Oct. 21, 1969 by Smith et el. and entitled Vinylidene Chloride Copolymer.

The following examples are merely illustrative and should not be construed as limiting the scope of the invention.

EXAMPLE 1

A. Preparation of the vinylidene chloride copolymer emulsion

The following premixtures were prepared to be used in preparation of vinylidene chloride copolymer latex:

| Emulsifier Monomer Premixture | | Percent Composition | Parts by Weight/100 Parts Total Monomer | Quantities for 1,500 Kilogram Batch |
|---|---|---|---|---|
| 1. | Water | 10.225 | 18.162 | 153.38 |
| 2. | Emulsifier[1] | 0.340 | 0.604 | 5.10 |
| 3. | Water | 1.000 | 1.776 | 15.00 |
| 4. | Emulsifier (20% Igepal CO-880) | 5.100 | 9.059 | 76.50 |
| 5. | Acrylamide | 0.300 | 0.533 | 4.50 |
| 6. | Itaconic Acid | 0.468 | 0.831 | 7.02 |
| 7. | Butyl Acrylate | 14.840 | 26.359 | 222.60 |
| 8. | Methyl Acrylate | 9.900 | 17.584 | 148.50 |
| 9. | Vinylidene Chloride | 25.200 | 44.760 | 378.00 |
| 10. | Water | 1.000 | 1.776 | 15.00 |
| | Initial Reactor Charge | | | |
| 11. | Water | 14.993 | 26.630 | 224.89 |
| 12. | Itaconic Acid | 0.052 | 0.092 | 0.78 |
| 13. | Emulsifier (20% Igepal CO-880) | 1.000 | 1.776 | 15.00 |
| 14. | Sodium Acetate | 0.100 | 0.178 | 1.50 |
| 15. | Acetic Acid | 0.025 | 0.044 | 0.38 |
| | Additional Reactor Charge | | | |
| 16. | Vinylidene Chloride | 2.800 | 4.973 | 42.00 |
| 17. | Butyl Acrylate | 1.640 | 2.913 | 24.60 |
| 18. | Methyl Acrylate | 1.100 | 1.954 | 16.50 |
| | Promoter | | | |
| | A | | | |
| 19. | Ascorbic Acid | 0.062 | 0.110 | 0.93 |
| 20. | Water | 4.000 | 7.105 | 60.00 |
| | B | | | |
| 21. | Ascorbic Acid | 0.080 | 0.142 | 1.20 |
| 22. | Water | 0.600 | 1.066 | 9.00 |
| | Catalyst | | | |
| | A | | | |
| 23. | 50% Hydrogen Peroxide | 0.013 | 0.023 | 0.20 |
| 24. | Water | 0.237 | 0.421 | 3.55 |
| | B | | | |
| 25. | 50% Hydrogen Peroxide | 0.125 | 0.222 | 1.87 |
| 26. | Water | 4.000 | 7.105 | 60.00 |
| | C | | | |
| 27. | 50% Hydrogen Peroxide | 0.013 | 0.023 | 0.20 |
| 28. | Water | 0.237 | 0.421 | 3.55 |

[1]-A dry solid mixture of paraffin sulphonates with a medium chain length of 14–15 carbon atoms and manufactured and distributed by Farben Fabrik Bayer of West Germany as Emulgator K30.

In a purged, water cooled stainless steel reactor equipped with an agitator, there was charged the initial reactor charge ingredients above (i.e., 11–15). Upon dissolution of the initial reactor charge ingredients therein and stabilization of the reactor temperature to 35°C., the additional reactor charge ingredients (i.e., 12–18) were introduced into the reactor while separately adding catalyst A above to the reactor. Promoter A was then fed to the reactor at a rate of about 10 liters per hour. The Promoter A feed was controlled to insure a steady reaction and a rise in reaction temperature to 40°–45°C. Pressure was maintained at about 1 to 5 pounds per square inch above atmospheric pressure throughout the entire reaction. After about 40 minutes, 10% of the additional reactor charge monomers had been charged and reacted. While maintaining the reaction temperature between 40°C. and 45°C., the Emulsifier Monomer Premixture was metered into the reactor at a rate of 60 liters/hour for the first half hour, 120 liters per hour for the next 30 minutes and after one hour, 180 liters per hour until all of the Emulsifier Monomer Premixture has been added to the reactor.

Within the same time sequence, Catalyst B was metered into the reactor at a rate of 3.7, 7.3 and 11.0 liters per hour respectively for the first 30 minutes, 30–60 minutes and 60 minutes to completion of the charging of the Emulsifier Monomer Premixture. Maintaining the reaction temperature within the 40°–45°C. range was primarily controlled by regulating the reactor feed rate of Promoter A above. The Promoter A feed rate generally ranged between 4–8 liters per hour with the feed being increased as the reaction temperatures decreased and feed rate correspondingly decreased with reactor temperature rises. About 5½ hours after commencing the Emulsifier Monomer Premixture addition, all of the premixture had been charged to the reactor. Upon completion of the Emulsifier Monomer Premixture Charge, the exothermic reaction temperature began to decrease whereupon the remaining portion of Catalyst B and Promoter A was charged to reactor. (Final charge of Catalyst B and Promoter A may not be necessary if polymerization reaction has gone to completion.) If after the addition of catalyst B and Promoter A, a high exothermic or pressure persists, Promoter C and Catalyst C each in 25% aliquot portions are to be added to the reactor. After observing neither a high exothermic or reaction pressure in the reactor, the vinylidene chloride emulsion was cooled and adjusted to pH of 4.0 with 35% ammonia. The unstripped vinylidene chloride copolymer emulsion was characterized as follows:

| | |
|---|---|
| Total Non-Volatile; % by wt. (2 hrs. at 105°C.) | 55 |
| pH | 4.0 |
| Viscosity cps (Brookfield) Model RVT Spindle No. 1 at 20 Rpm) | 20 |
| Specific Gravity | 1.268 |
| Wt./Gallon, Lbs. | 10 |
| Wt./Gallon (Solids) | 11.60 |
| Particle Size, Microns | 0.3 |
| Colloidal Charge | Anionic/nonionic |
| Minimum film forming temperature, °C. | 15 |
| Freeze-Thaw Stability | Protect |

B. Preparation vinylidene chloride emulsion composition

For each 100 parts by weight copolymer dry solids, there was uniformly blended into the vinylidene chloride copolymer emulsion of A above a total emulsion compostion content of 4.59 parts by weight acetic acid and 4.72 parts by weight sodium acetate. The resultant vinylidene chloride emulsion composition had a pH of 4.0, a total non-volatile solid content (after oven drying for 2 hours at 105°C.) of 55% by weight and a viscosity of 20 cps (Brookfield Model RVT No. 1 spindle at 20 rpm at 20°C.).

C. Cedar coating test panel results

A portion of the vinylidene chloride emulsion composition in combination with about 4% tributyl phosphate was applied by brushing to cedar test panels evincing a particular high phenolic surface content. It was observed that the emulsion composition uniformly wetted and adhered to the surface of the cedar panel. The coated test panels were allowed to dry overnight under ambient conditions (at about 72°F.). Upon drying, the coated test panels were characterized as being a uniform, clear, non-tacky surface coating and permanently bonded to the test panel surface. The coated test panels were then subjected to outdoor testing at a test site located in the vicinity of Newark, New Jersey. After one year's exposure, the test panels exhibited excellent durability and free from bleeding.

D. Preparation of a non-mercurial, non-leaded high quality primer

A white exterior house paint for coating redwoods was prepared by uniformly blending in a high speed disperser the following ingredients:

| Materials | Pounds | Gallons |
|---|---|---|
| Water | 93.57 | 11.22 |
| Thickener (2% sol.)[2] | 126.37 | 15.08 |
| Paint dispersant[3] | 12.00 | 1.38 |
| Hexylene Glycol | 20.00 | 2.14 |
| Paint dispersant[4] | 3.20 | 0.40 |
| Paint dispersant[5] | 3.42 | 0.42 |
| Defoamer[6] | 2.00 | 0.20 |

[2] "Hercules X-158" by Hercules, Inc., Wilmington, Delaware.
[3] Clearate WD by W. A. Cleary Co., New Brunswick, New Jersey.
[4] Surfactol 365 by The Baker Castor Oil Co., Bayonne, New Jersey.
[5] Tamol 731 (25%) by Rohm & Haas Co., Philadelphia, Pennsylvania.
[6] Colloids 691F by Colloids, Inc., Newark, New Jersey.

After uniformly blending, there was then blended the following paint additivese:

| | | |
|---|---|---|
| Titanium Dioxide (chloride type) | 250.00 | 7.15 |
| Barium metaborate[7] | 200.00 | 7.18 |
| Extender[8] | 20.00 | 0.86 |
| Extender[9] | 80.00 | 3.72 |
| Lead-Free Zinc Oxide | 12.00 | 0.26 |

[7] Modified barium metaborate sold as Busan 11-Ml by Buckman Lab., Inc., Memphis, Tennessee.
[8] An extender sold as 325 English Mica by The English Mica Company.
[9] An extender sold as 325 English Mica by Freeport Kaolin.

The above paint additives were then ground at a high speed for 15 minutes. With slow agitation, there was then simultaneously added to the grind 2.00 pounds of additional defoamer and 497.85 pounds (49.79 gallons) of the vinylidene chloride emulsion composition of 1(b) above with the agitation thereof being discontinued upon achieving a uniform paint blend. The primer had the following properties:

| | | |
|---|---|---|
| Pig. Vol. Conc. | | 44.2% |
| Total Non-Volatile | | 64.43% |
| pH | | 6.8–7.2 |
| Weight/Gallon | | 13.22 ± .2 |
| Viscosity | Initial | 80–85 KU |
| | After 12 Hrs. | 85–90 KU |

EXAMPLE 2

A non-leaded high quality primer containing a fast-drying castor oil derivative as a minor film former and vinylidene chloride copolymer emulsion component of Example 1(B) above was prepared in accordance with the method of Example 1(D) above. The general procedure, paint ingredients and paint physical properties were as follows:

| Materials | Pounds | Gallons |
|---|---|---|
| Charge the following to a high-speed disperser under agitation: | | |
| Water | 83.40 | 10.00 |
| Thickener (2% sol.)[10] | 160.14 | 19.11 |
| Hexylene Glycol | 24.30 | 2.62 |
| Paint dispersant[11] | 6.48 | 0.65 |
| Drying oil[12] | 40.50 | 5.17 |
| 6% Cobalt Naphahenate | 0.73 | 0.08 |
| Mix well, then add the following under agitation: | | |
| Titanium Dioxide | 250.00 | 7.15 |
| Barium metaborate[13] | 121.50 | 4.37 |
| Extender[14] | 20.25 | 0.86 |
| Grind the above at a high speed for 10–15 minutes; lower speed; thin under slow agitation: | | |
| Defoamer[15] | 2.00 | 0.20 |
| Vinylidene Chloride Copolymer Emulsion[16] | 495.85 | 49.79 |
| Typical Physical Constants: | | |
| Pig. Vol. Conc. | | 29.71% |
| Total Non-Volatile | | 59.29% |
| Weight/Gallon | | 12.07 ± .2 |
| Viscosity Initial | | 70–75 KU |
| After 12 Hrs. | | 75–80 KU |
| pH | | 6.8–7.2 |

[10]Footnote 2 supra.
[11]Footnote 4 supra.
[12]Modified fast-drying castor oil derivative sold as Castung 235 by The Baker Chemical Co., Bayonne, New Jersey.
[13]Footnote 7 supra.
[14]Footnote 8 supra.
[15]Footnote 6 above.
[16]A vinylidene chloride copolymer emulsion composition sold as Polidene P-766 by A. E. Staley Chemical Co., Kearny, New Jersey.

The aforementioned paint was particularly adapted for use in painting excessively chalky redwood and cedar woods and inhibiting migration of the wood staining principals to the primer coat.

EXAMPLE 3

A self-priming exterior house paint was prepared employing the following materials and general procedure:

| Materials | Pounds | Gallons |
|---|---|---|
| Charge the following to a high speed disperser under agitation: | | |
| Water | 166.80 | 20.00 |
| Thickener (2% solids)[17] | 40.40 | 4.82 |
| Paint dispersant[18] | 12.00 | 1.38 |
| Hexylene Glycol | 20.00 | 2.14 |
| Paint dispersant[19] | 8.20 | 0.82 |
| Defoamer[20] | 2.00 | 0.20 |
| Mix well, then add the following under agitation: | | |
| Titanium Dioxide | 275.00 | 7.88 |
| Barium metaborate[21] | 220.00 | 7.93 |
| Extender[22] | 20.00 | 0.86 |
| Extender[23] | 100.00 | 3.60 |
| Grind the above at high speed for 10–15 minutes; lower speed; thin under slow agitation: | | |
| Defoamer[24] | 2.00 | 0.20 |
| Vinylidene chloride copolymer emulsion Composition of Example 1(b) | 550.00 | 55.00 |
| Paint Physical Properties: | | |
| Weight/Gallon | | 13.51 |
| Viscosity Initial | | 80–85 KU |
| Overnight | | 85–90 KU |
| Pig. Vol. Conc. | | 43.20% |
| Total Non-Volatile | | 66.03% |
| pH | | 6.8–7.2 |

[17]"Cellosize QP-4400" by Union Carbide Corp. New York, New York.
[18]Footnote 3.
[19]Footnote 4.
[20]Footnote 6.
[21]Footnote 7.
[22]Footnote 8.
[23]Footnote 9.
[24]Footnote 6.

EXAMPLE 4

A non-mercurial, non-leaded unmodified primer was prepared and characterized as follows:

| Materials | Pounds | Gallons |
|---|---|---|
| Charge the following to a high speed disperser under agitation: | | |
| Water | 34.53 | 4.14 |
| Thickener (2% sol.)[25] | 282.00 | 33.65 |
| Paint dispersant[26] | 9.94 | 1.14 |
| Hexylene Glycol | 15.60 | 1.80 |
| Paint dispersant[27] | 3.76 | 0.47 |
| Paint dispersant[28] | 4.01 | 0.49 |
| Defoamer[29] | 1.69 | 0.17 |
| Mix well, then add under agitation: | | |
| Titanium Dioxide | 200.00 | 5.70 |
| Barium metaborate[30] | 175.00 | 6.28 |
| Extender[31] | 20.00 | 0.85 |
| Extender[32] | 67.14 | 3.12 |
| Grind the above high speed for 10–15 minutes; lower speed; thin under slow agitation: | | |
| Defoamer[33] | 1.69 | 0.17 |
| Vinylidene Chloride Copolymer Emulsion[34] | 420.21 | 42.02 |
| Typical Physical Constants: | | |
| Pig. Vol. Conc. | | 43.93% |
| Total Non-Volatile | | 57.60 |
| Weight/Gallon | | 12.36 ± .2 |
| Viscosity Initial | | 70–75 KU |
| After 12 Hrs. | | 75–80 KU |
| pH | | 6.8–7.2 |

[25]Footnote 17.   [30]Footnote 7.
[26]Footnote 3.    [31]Footnote 8.
[27]Footnote 4.    [32]Footnote 9.
[28]Footnote 5.    [33]Footnote 6.
[29]Footnote 6.    [34]Footnote 16.

EXAMPLE 5

A water paint possessing excellent adhesion to previously painted surfaces and also adapted for use as a self-priming topcoat for metallic and wood substrates including redwoods and cedars was prepared as follows:

| Materials | Pounds | Gallons |
|---|---|---|
| The following were charged to a high speed disperser under agitation: | | |
| Thickener (2% solids)[35] | 88.00 | 10.50 |
| Ethylene Glycol | 30.00 | 3.24 |
| Defoamer[36] | 2.00 | 0.20 |
| Paint dispersant[37] | 9.00 | 0.98 |
| 2-amino, 2-methyl, 1-proponal | 4.00 | 0.46 |
| Non-mercurial Mildicide | 5.00 | 0.50 |
| The aforementioned were uniformly mixed and then the following ingredients were added under agitation: | | |
| Surfactant[38] | 8.00 | 0.88 |
| Alkyd "Lang oil" | 83.50 | 10.00 |
| Titanium Dioxide (Rutile) | 200.00 | 5.72 |
| Zinc Oxide 631 | 100.00 | 2.16 |
| Barite[39] | 45.00 | 1.91 |
| Aluminum Silicate[40] | 80.00 | 3.70 |
| Grind the above at high speed for 10–15 minutes, lower speed thin under slow agitation and blend thereto: | | |
| Vinylidene Chloride Copolymer Emulsion Composition (1B) | 634.50 | 63.45 |
| Paint drier[41] | 0.60 | 0.08 |
| Cobalt Naphthanate (6%) | 0.60 | 0.07 |
| Tributyl Phosphate | 8.40 | 1.04 |
| | 1,298.60 | 104.89 |
| The resultant water paint was characterized as: | | |
| Weight/Gallon | | 12.4 ± 2 |
| Viscosity Initial | | 70–75 KU |
| 12 Hours | | 75–80 KU |
| P.V.C. | | 25.20% |
| Solids by Vol. | | 51.10% |
| Solids by Weight | | 61.50 |
| pH | | 6.8–7.2 |
| Roll Mill Stability | | − 4 weeks + |
| Excellent low temperature coalesces | | |

[35]Footnote 17.
[36]Footnote 6.
[37]Footnote 5.
[38]Triton X-305 by Rohm & Haas Co., Philadelphia, Pennsylvania.
[39]Barytees X5R by Hercules, Inc., Wilmington, Delaware.
[40]Minex 7 an extender by American Nepheline Corporation.
[41]Zirco by Cinn. Milacron Chem., Inc., O.C., New Brunswick, New Jersey.

EXAMPLE 6

Several cedar and redwood test panels evincing a high propensity for surface staining and bleeding upon coating with a water paint were selected for outdoor testing at sites in the vicinity of Newark, N.J. and Miami, Fla. These test panels were brush painted with the water paints of Examples 1(D), 2, 3, 4 and 5. It was observed that the water adhesion, covering power were excellent with the paint leveling properties ranging from very good to excellent. After aging for a year to 2 years at the test sites, the test panels exhibited excellent durability and adhesion without any cracking, alligatoring, crazing, pinholing or peeling from the substrate surface. All the exterior test panels were rated as possessing excellent stability against bleeding with no visible diffusion of the test panel staining principals into or through the coating. The coatings were characterized as possessing excellent color uniformity without yellowing. The barrier characteristics against diffusion of gases and moisture were excellent. The resistance towards physical and chemical degradation characteristics of the panels including moisture penetration, greases, oils and other deleterious solvents of the panels was excellent. Similar results are achieved when various other substrates such as thermoplastics, thermoset resins, woods of a low phenolic content, metals, fabrics, etc. as well as previously painted or primed substrates (e.g., water paints and drying oil type paints including the alkyds) are painted or coated with the water paints herein.

Since many embodiments of this invention may be made and since many changes may be made in the embodiments described, the foregoing is to be interpreted as illustrative only and the invention is defined by the claims appended hereafter.

What is claimed is:

1. A vinylidene chloride copolymer emulsion composition suitable for use as an aqueous based coating vehicle for inhibiting bleeding when woods of a high phenolic wood content are coated therewith, said emulsion composition comprising:
   A. a vinylidene chloride copolymer containing:
      a. about 40% to about 80% by weight vinylidene chloride,
      b. about 20% to 60% by weight of an alkyl ester of an alpha, beta-ethylenically unsaturated acid wherein the alkyl ester group containing from 1 to 8 carbon atoms, and
      c. about 0.5 to about 3% by weight of at least one alpha, beta-ethylenically unsaturated monomer selected from the group consisting of an ethylenically unsaturated monocarboxylic acid, an ethylenically unsaturated dicarboxylic acid, an ethylenically unsaturated dicarboxylic acid anhydride, acrylamide, methacrylamide and N-substituted acrylamides,
   B. an organic monocarboxylic acid in an amount ranging from at least 3 parts by weight to about 10 parts for each 100 parts by weight vinylidene chloride copolymer dry solids, and
   C. an organic acid salt buffering agent in an amount sufficient to buffer the vinylidene chloride copolymer emulsion composition to a pH of about 3.0 to about 6.0.

2. The emulsion composition of claim 1 wherein the copolymer has a glass transition temperature ranging from about 273°K. to 293°K.

3. The emulsion composition according to claim 2 wherein the organic monocarboxylic is an alkanoic containing from 1 to 4 carbon atoms inclusive.

4. The composition according to claim 3 wherein the acid is acetic acid and the buffering agent is an acetate salt in an amount sufficient to buffer the emulsion to a pH of about 3.5 to about 5.0.

5. The composition according to claim 4 wherein the acetic acid ranges from about 4.5 to about 8.5 parts by weight.

6. The composition according to claim 3 wherein the buffering agent is an alkanoic acid salt containing from 2 to 4 carbon atoms inclusive and cationic moiety is at least one member selected from the group of an alkali metal salt and an ammonium.

7. The composition according to claim 6 wherein the buffering agent is an acetate salt and the organic acid is acetic acid in an amount ranging from at least 4.0 parts by weight to about 6 parts by weight for each 100 parts by weight vinylidene copolymer solids and the weight ratio of acetic acid to acetate salt ranges from about 1:1 to about 3:2.

8. The composition according to claim 7 wherein the principal copolymerized monomer on a weight basis is vinylidene chloride and the principal alkyl ester of an alpha, beta-ethylenically unsaturated acid is butyl acrylate.

9. The composition according to claim 8 wherein the glass transition temperature of the copolymer ranges from about 278°K. to about 288°K.

10. The composition according to claim 9 wherein the vinylidene chloride copolymer has copolymerized therewith from about 0.75% to 1.25% by weight itaconic acid.

11. The composition according to claim 10 wherein the vinylidene chloride copolymer has copolymerized therewith from about 0.4 to about 0.6% by weight acrylamide.

12. The composition according to claim 7 wherein the acetate salt is sodium acetate.

13. The composition according to claim 1 wherein the organic acid is a lower alkyl monocarboxylic acid having from 2 to 4 carbon atoms inclusive in an amount ranging from about 4.5 to about 6.0 parts by weight and the salt is an alkali metal salt of a lower alkyl monocarboxylic acid in an amount ranging from about 4.5 to about 6.0 parts by weight.

14. The composition according to claim 13 wherein the copolymerized vinylidene chloride content of the copolymer is between about 45% to about 55% by weight and the copolymer has a glass transition temperature of about 278°K. to about 293°K.

15. The composition according to claim 14 wherein the copolymer consists essentially of copolymerized vinylidene chloride, butyl acrylate, methyl acrylate, acrylamide and itaconic acid.

16. In a water paint comprising pigments, a paint vehicle and other paint additives as required, the improvement which comprises as the principal paint vehicle solids vinylidene chloride copolymer emulsion composition with the water paint being adapted to retard surface staining of phenolic-containing wood when coated therewith, said vinylidene chloride copolymer vehicle solids comprising:
   A. vinylidene chloride copolymer containing:
      a. about 40% to 80% by weight vinylidene chloride,
      b. about 20% to 60% by weight of an alkyl ester of an alpha, beta-ethylenically unsaturated acid wherein the alkyl ester group containing from 1 to 8 carbon atoms, and c. about 0.5 to about 3% by weight of at least one alpha, beta-ethylenically unsaturated monomer selected from the group consisting of an ethylenically unsaturated monocarboxylic acid, an ethylenically unsaturated dicarboxylic acid, an ethylenically unsaturated dicarboxylic acid anhydride, acrylamide, methacrylamide and N-substituted acrylamides, B. an organic monocarboxylic carboxylic acid in an amount ranging from at least 3 parts by weight to about 10 parts for each 100 parts by weight vinylidene chloride copolymer dry solids, and C. an organic acid salt buffer in an amount ranging from about 3 to about 10 parts by weight for each 100 parts by weight vinylidene chloride copolymer dry solids, said water paint composition being further characterized as having a pH within the range of about 6.0 to 8.0.

17. The water paint of claim 16 wherein the vinylidene chloride copolymer emulsion comprises at least a major portion of the paint vehicle solids on a total vehicle dry solids weight basis.

18. The water paint according to claim 17 wherein the water paint vehicle consists essentially of the vinylidene chloride copolymer and a minor amount of a drying oil.

19. The water paint of claim 16 wherein substantially all of the paint vehicle is comprised of the vinylidene chloride copolymer.

20. The water paint of claim 16 wherein the vinylidene chloride copolymer is characterized as being comprised of about 45% to about 70% by weight vinylidene chloride and the amount of alkyl ester monomer in conjunction with the other copolymerized comonomers is sufficient to provide a copolymer glass transition temperature ranging from about 278°K. to about 288°K.

21. The water paint of claim 20 wherein the organic acid is an alkanoic acid having from 2 to 4 carbon atoms inclusive and the organic acid salt is at least one member selected from the group consisting of an alkali metal salt of an alkanoic acid containing from 2 to 4 carbon atoms inclusive and an ammonium salt of an alkanoic acid of 2 to 4 carbon atoms inclusive.

22. The water paint of claim 21 wherein the amount of organic acid in the water paint ranges from about 4.0 to about 6 parts by weight for each 100 parts by weight vinylidene chloride copolymer and the weight ratio of organic acid to organic acid salt ranges from about 9:10 to 3:2.

23. The water paint according to claim 22 wherein the organic acid is acetic acid and the organic acid salt is at least one member selected from the group consisting of ammonium acetate, potassium acetate and sodium acetate.

24. The water paint according to claim 23 when the organic acid salt is sodium acetate and the weight ratio of acid to salt is about 1:1.

25. The water paint according to claim 16 wherein the pigment volume concentration of the water paint ranges from about 20% to about 50%.

26. The water paint according to claim 25 wherein the organic acid is a lower alkyl monocarboxylic acid in an amount ranging from about 3.5 to about 6.0 parts by weight and the salt is at leasts one selected from the group consisting of an ammonium salt of a lower alkyl monocarboxylic and an alkali metal salt of a lower alkyl monocarboxylic acid with the weight ratio of acid to salt ranging from about 9:10 to about 3:2.

27. The water paint according to claim 26 wherein the percent by weight of the copolymerized vinylidene chloride in the copolymer is between about 45% to about 55% with the copolymer having a glass transition temperature of about 278°K. to about 293°K.

28. The water paint according to claim 27 wherein the paint composition is substantially free from lead and mercuric additive.

29. The water paint according to claim 27 wherein the pigment volume concentration is between about 23% to less than 30% and the vinylidene chloride copolymer emulsion composition solids comprises from 50% by weight to about 75% by weight of the total vehicle dry solids weight.

30. The water paint according to claim 27 wherein the pigment volume concentration ranges from about 35% to about 45% and the vinylidene chloride copolymer emulsion composition dry solids on a total vehicle dry solids weight ranges from about 35% to about 45% by weight.

31. The water paint according to claim 29 wherein the salt is sodium acetate and the acid is acetic acid.

32. The water paint according to claim 30 wherein the salt is sodium acetate and the acid is acetic acid.

* * * * *

UNITED STATES PATENT OFFICE
CERTIFICATE OF CORRECTION

PATENT NO. : 3,883,455
DATED : May 13, 1975
INVENTOR(S) : Charles E. Peos

It is certified that error appears in the above-identified patent and that said Letters Patent are hereby corrected as shown below:

Column 1, line 68, for "effecting" read ---affecting---
Column 3, line 5, for "water soluble" read ---water-soluble---
Column 3, line 10, for "effecting" read ---affecting---
Column 3, line 59, for "unsaturated which" read ---unsaturated acid which---
Column 4, line 67, for "cooperatively impart and" read ---cooperatively and---
Column 5, line 4, for "to utilize in general" read ---to utilize, in general,---
Column 5, line 25, for "proponoic" read ---propanoic---
Column 5, line 26, for "dodeconoic" read ---dodecanoic---
Column 5, line 49; for "effect" read ---affect---
Column 6, line 23, for "water dispersible film forming" read ---water-dispersible, film-forming---
Column 6, line 68, for "preservatives, other" read ---preservatives and other---
Column 7, line 9, for "water dispersible" read ---water-dispersible---
Column 7, line 64, for "effecting" read ---affecting---
Column 9, line 30, for "(Final" read ---Final---
Column 9, line 32, for "competition)." read ---competition.---
Column 16, line 21, for "monocarboxylic and" read ---monocarboxylic acid and---

UNITED STATES PATENT OFFICE
CERTIFICATE OF CORRECTION

PATENT NO. : 3,883,455
DATED : May 13, 1975
INVENTOR(S) : Charles E. Peos

It is certified that error appears in the above-identified patent and that said Letters Patent are hereby corrected as shown below:

Column 4, line 42, for "N-unsubstituted" read ---N-substituted---
Column 6, line 27, for "imparied" read ---impaired---
Column 6, line 40, for "barrium" read ---barium---
Column 6, line 63, for "will" read ---with---
Column 8, Footnote to table, for "Farben Fabrik" read ---Farbenfabriken---
Column 9, line 11, for "has" read ---had---
Column 10, line 20, for "paint for" read ---paint suitable for---
Column 10, line 39, for "additivese" read ---additive---
Column 10, line 48 (Footnote 9), for "325 English Mica" read ---Alsilate NC01---
Column 14, line 2, for "monocarboxylic is" read ---monocarboxylic acid is---
Column 14, line 61, for "solids vinylidene" read ---solids a vinylidene---
Column 15, line 11, for "monocarboxylic carboxylic acid" read ---monocarboxylic acid---
Column 15, line 30, for "vehicle is" read ---vehicle solids is---
Column 16, line 20, for "leasts" read ---least---

Signed and Sealed this eleventh Day of November 1975

[SEAL]

Attest:

RUTH C. MASON
Attesting Officer

C. MARSHALL DANN
Commissioner of Patents and Trademarks